(12) United States Patent
Obermair et al.

(10) Patent No.: US 11,916,236 B2
(45) Date of Patent: Feb. 27, 2024

(54) CERAMIC COMPONENT AND METHOD FOR MANUFACTURING THE CERAMIC COMPONENT

(71) Applicant: TDK Electronics AG, Munich (DE)

(72) Inventors: Stefan Obermair, Stainz (AT); Yongli Wang, Frauental (AT); Andreas Egger, Graz (AT); Manfred Schweinzger, Schwanberg (AT)

(73) Assignee: TDK Electronics AG, Munich (DE)

( * ) Notice: Subject to any disclaimer, the term of this patent is extended or adjusted under 35 U.S.C. 154(b) by 751 days.

(21) Appl. No.: 17/042,718

(22) PCT Filed: Mar. 19, 2020

(86) PCT No.: PCT/EP2020/057631
§ 371 (c)(1),
(2) Date: Sep. 28, 2020

(87) PCT Pub. No.: WO2020/207743
PCT Pub. Date: Oct. 15, 2020

(65) Prior Publication Data
US 2021/0135221 A1 May 6, 2021

(30) Foreign Application Priority Data
Apr. 9, 2019 (DE) .......................... 102019109308.2

(51) Int. Cl.
*H01M 4/58* (2010.01)
(52) U.S. Cl.
CPC ................................ *H01M 4/5825* (2013.01)

(58) Field of Classification Search
CPC ........ H01M 4/5825; H01M 4/02; H01M 4/62; H01M 4/664
See application file for complete search history.

(56) References Cited

U.S. PATENT DOCUMENTS

| | | | |
|---|---|---|---|
| 5,781,402 | A | 7/1998 | Fujiyama et al. |
| 8,558,191 | B2 | 10/2013 | Shimazu |
| 9,054,391 | B2 | 6/2015 | Sato et al. |
| 9,305,705 | B2 | 4/2016 | Jeon et al. |
| 9,660,252 | B2 | 5/2017 | Gaben et al. |

(Continued)

FOREIGN PATENT DOCUMENTS

| | | |
|---|---|---|
| CN | 103253989 A | 8/2013 |
| CN | 103373860 A | 10/2013 |

(Continued)

*Primary Examiner* — Adam A Arciero
(74) *Attorney, Agent, or Firm* — Slater Matsil, LLP

(57) ABSTRACT

A ceramic component and a method for manufacturing a ceramic component are disclosed. In an embodiment a ceramic component includes a ceramic base body and at least one metallization located an outer surface of the ceramic base body, wherein the metallization contains lithium vanadium phosphate having the general chemical formula $Li_xV_y(PO_4)_z$, copper and glass, wherein a is a proportion of copper, b is a proportion of lithium vanadium phosphate and c is a proportion of glass which is contained in the metallization, wherein the following applies: 40 wt. % ≤ a ≤ 99 wt. %, 1 wt. % ≤ b ≤ 30 wt. %, 0 wt. % ≤ c ≤ 20 wt. %, wherein x is a proportion of lithium, y is a proportion of vanadium and z is a proportion of phosphate in lithium vanadium phosphate, and wherein the following applies: 0<x, 0<y, 0<z.

15 Claims, 1 Drawing Sheet

(56) References Cited

U.S. PATENT DOCUMENTS

| | | |
|---|---|---|
| 10,207,958 B2 | 2/2019 | Herrmann et al. |
| 2002/0046861 A1 | 4/2002 | Yokoyama et al. |
| 2012/0154977 A1 | 6/2012 | Hur et al. |
| 2014/0233149 A1 | 8/2014 | Jeon et al. |
| 2016/0268630 A1 | 9/2016 | Tsukada et al. |
| 2017/0301803 A9 | 10/2017 | Wang et al. |
| 2020/0010369 A1 | 1/2020 | Sasaki et al. |
| 2020/0031670 A1 | 1/2020 | Sato et al. |

FOREIGN PATENT DOCUMENTS

| | | |
|---|---|---|
| CN | 105246861 A | 1/2016 |
| DE | 19714686 A1 | 10/1998 |
| DE | 112017004915 T5 | 6/2019 |
| DE | 102018200110 A1 | 7/2019 |
| EP | 0265231 A2 | 4/1988 |
| EP | 2774194 B1 | 9/2014 |
| JP | 2001035739 A | 2/2001 |
| JP | 2013168369 A | 8/2013 |
| JP | 2013168396 A | 8/2013 |
| JP | 2014160793 A | 9/2014 |
| JP | 2017183052 A | 10/2017 |
| JP | 2018063905 A | 4/2018 |
| JP | 2018063997 A | 4/2018 |
| JP | 2018170189 A | 11/2018 |
| JP | 2019003757 A | 1/2019 |
| KR | 20140104279 A | 8/2014 |
| WO | 2011125481 A1 | 10/2011 |
| WO | 2018181578 A1 | 10/2018 |
| WO | 2018181812 A1 | 10/2018 |
| WO | 2018186449 A1 | 10/2018 |

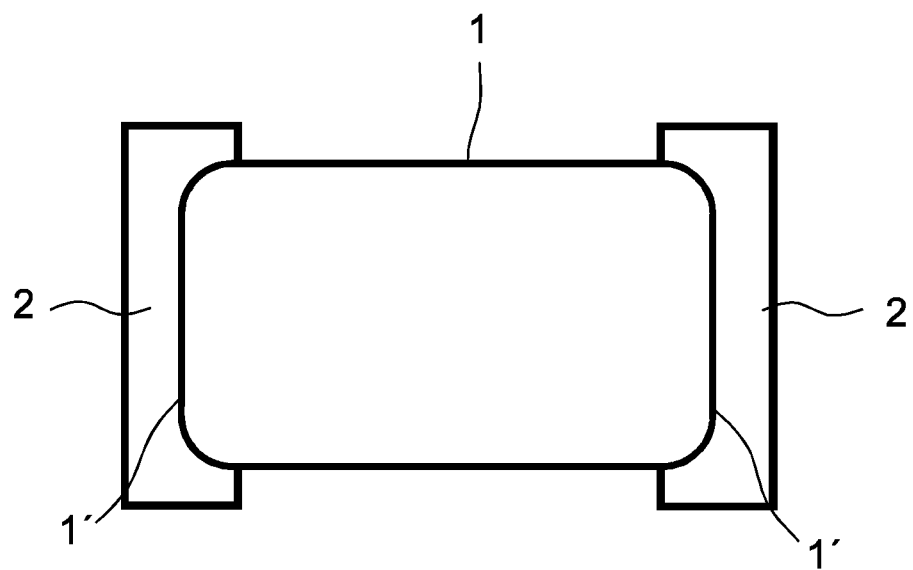

CERAMIC COMPONENT AND METHOD FOR MANUFACTURING THE CERAMIC COMPONENT

This patent application is a national phase filing under section 371 of PCT/EP2020/057631, filed Mar. 19, 2020, which claims the priority of German patent application 102019109308.2, filed Apr. 9, 2019, each of which is incorporated herein by reference in its entirety.

TECHNICAL FIELD

The present invention relates to a ceramic component having a ceramic base body and at least one metallization which is located at an outer surface of the ceramic base body. Furthermore, the invention relates to a method for manufacturing the ceramic component.

BACKGROUND

Ceramic components are widespread parts in industrial production. The ceramic components usually have metallizations, for example, for electrical contacting. The composition of the metallizations can have a negative influence on the ceramic base body of the ceramic component.

SUMMARY

Embodiments provide a ceramic component having an improved metallization. Further embodiments provide methods for manufacturing the ceramic component.

A ceramic component is provided comprising a ceramic base body and at least one metallization applied to an outer surface of the ceramic base body. The metallization contains lithium vanadium phosphate having the general chemical formula $Li_xV_y(PO_4)_z$ and copper. Glass can also be optionally contained in the metallization. In this case, a is the proportion of copper, b is the proportion of lithium vanadium phosphate and c is the proportion of glass which are contained in the metallization, and the following applies:

40 wt. % ≤ a ≤ 99 wt. %,
1 wt. % ≤ b ≤ 30 wt. %,
0 wt. % ≤ c ≤ 20 wt. %, wherein x is the proportion of lithium, y is the proportion of vanadium and z is the proportion of phosphate in the lithium vanadium phosphate, and the following applies:
0<x,
0<y,
0<z.

In a further embodiment of the metallization, lithium vanadium phosphate having the general chemical formula $Li_xV_y(PO_4)_z$ and copper and glass or lithium vanadium phosphate having the general chemical formula $Li_xV_y(PO_4)_z$ and copper have been used as the parent substances for the manufacture of the metallization, wherein, in the general chemical formula of the lithium vanadium phosphate, x is the proportion of lithium, y is the proportion of vanadium and z is the proportion of phosphate, and the following applies:
0.5<x<4.5,
1.8<y<2.2,
2.8<z<3.2.

In a preferred embodiment of the metallization, lithium vanadium phosphate having the chemical formula $Li_3V_2(PO_4)_3$ and copper and glass or lithium vanadium phosphate having the chemical formula $Li_3V_2(PO_4)_3$ and copper have been used as the parent substances for the manufacture of the metallization.

The metallization can be produced by means of affixing and burning-in a metal-containing paste, wherein the metal-containing paste contains copper and lithium vanadium phosphate. Optionally, glass can also be contained in the metal-containing paste.

The ceramic component can be a ceramic battery. The metallization can additionally serve as a connecting surface for electrical contacting of the ceramic component.

The composition of the metallization is optimally adapted to the composition of the ceramic base body of the ceramic component. Thus, the amount of copper in the metallization guarantees electric conductivity of the metallization, which makes it possible to install the ceramic component in electronic parts. The amount of lithium vanadium phosphate in the metallization additionally guarantees sufficient adhesion of the metallization to the ceramic base body. Here, the term "sufficient" is to be understood to be an adhesion where the metallization does not detach from the ceramic base body under the usual requirements of industrial production. Furthermore, the lithium vanadium phosphate does not interact in a negative way with the ceramic base body, as a result of which negative influences on the ceramic base body can be avoided.

Furthermore, the metallization can have at least one top layer which contains at least copper and/or nickel and/or tin. Thanks to this top layer, the ceramic part can be soldered as a surface mounted device. As a result, the ceramic part can be integrated into conventional fabrication processes for electronic parts, as a result of which the production costs may be kept low.

A method for manufacturing the ceramic component can comprise the following sub-steps:
providing a green body,
rounding off of the edges of the green body,
affixing of a metal-containing paste which contains copper and lithium vanadium phosphate to at least one outer surface of the green body,
sintering of the green body in order to obtain a ceramic base body which has a metallization on an outer surface.

A further method for manufacturing the ceramic component can have the following sub-steps:
providing a green body,
sintering of the green body in order to obtain a ceramic base body,
rounding off of the edges of the ceramic base body,
affixing of a metal-containing paste which contains copper and lithium vanadium phosphate to at least one outer surface of the ceramic base body,
burning of the metal-containing paste into the ceramic base body in order to obtain a metallization.

The advantage of the first-mentioned method is that the metal-containing paste is already affixed to the green body and is sintered together with the green body. Thanks to the sintering, a ceramic base body is created from the green body, and the metallization is created from the metal-containing paste. This removes the need for an additional burning-in step, in order to burn in the metal-containing paste, thus making it possible to reduce the costs of manufacturing the ceramic component.

A paste which contains copper, lithium vanadium phosphate and binding agents and solvents can be affixed to the ceramic base body as a metal-containing paste. Optionally, the paste can also contain glass. If a is the proportion of copper, b is the proportion of lithium vanadium phosphate, c is the proportion of glass and d is the proportion of binding agents and solvents in the metal-containing paste, the following applies:

40 wt. %≤a≤90 wt. %,
1 wt. %≤b≤30 wt. %,
0 wt. %≤c≤20 wt. %,
9 wt. %≤d≤60 wt. %.

In an advantageous embodiment of the paste, the proportion by weight of copper is 56 wt. % and the proportion by weight of lithium vanadium phosphate is 12.5 wt. %, wherein no glass is contained in the paste. Furthermore, the amount of binding agents and solvents is 31.5 wt. %. The total of all of the proportions is 100 wt. %.

Furthermore, in the case of the method for manufacturing the ceramic component, at least one of the thermal processes, which is selected from a group comprising sintering and burning-in, can be performed in a reductive atmosphere. The term "reductive atmosphere" is to be understood, here and below, to be an atmosphere which prevents an oxidation of the ceramic component by atmospheric oxygen to the greatest possible extent. As a result, the oxidation of the copper contained in the metallization can in particular be avoided, as a result of which the electric conductivity of the metallization can be guaranteed.

At least one top layer which contains copper and/or nickel and/or tin can be additionally affixed to the metallization. The affixing of the top layer can be effected by galvanic, chemical or physical methods such as, for example, sputtering.

BRIEF DESCRIPTION OF THE DRAWINGS

The invention is described in greater detail below with reference to an exemplary embodiment and the accompanying FIGURE.

The FIGURE shows a ceramic component having a ceramic base body and metallizations on outer surfaces of the ceramic base body.

The FIGURE and the ratios in the FIGURE are not true to scale.

DETAILED DESCRIPTION OF ILLUSTRATIVE EMBODIMENTS

The FIGURE shows a ceramic component having a ceramic base body 1 and two metallizations 2 which are applied to two opposite outer surfaces 1' of the ceramic base body 1. The ceramic component is a ceramic battery. In order to manufacture the ceramic component, a green body (not depicted) is provided, in which the edges are rounded off. A metal-containing paste, which contains 56 wt. % copper, 12.5 wt. % lithium vanadium phosphate and 31.5 wt. % binding agents and solvents is subsequently affixed to two opposite outer surfaces (not depicted) of the green body (not depicted). The green body (not depicted), to which the metal-containing paste is affixed, is subsequently sintered. The sintering creates the ceramic base body 1 of the ceramic component and the two metallizations 2 which each contain copper and lithium vanadium phosphate. Thanks to the copper, the electric conductivity of the metallization is ensured. Due to the lithium vanadium phosphate sufficient adhesion of the metallization to the ceramic base body can be ensured, while no negative influences on the ceramic base body 1 are produced by the lithium vanadium phosphate.

Although the present invention has only been described with reference to one exemplary embodiment, the invention is not restricted to said exemplary embodiment. Rather, the composition of the paste which has been used to manufacture the metallization can vary, and the method for manufacturing the ceramic component can also vary.

The invention claimed is:

1. A ceramic component comprising:
a ceramic base body; and
at least one metallization located an outer surface of the ceramic base body,
wherein the metallization contains lithium vanadium phosphate having the general chemical formula $Li_xV_y(PO_4)_z$, copper and optionally glass,
wherein a is a proportion of copper, b is a proportion of lithium vanadium phosphate and c is a proportion of the optional glass, which is contained in the metallization,
wherein the following applies:
40 wt. %≤a≤99 wt. %,
1 wt. %≤b≤30 wt. %, and
0 wt. %≤c≤20 wt. %,
wherein x is a proportion of lithium, y is a proportion of vanadium and z is a proportion of phosphate in lithium vanadium phosphate, and
wherein the following applies:
0<x,
0<y, and
0<z.

2. The ceramic component according to claim 1,
wherein lithium vanadium phosphate having the general chemical formula $Li_xV_y(PO_4)_z$, copper and glass or lithium vanadium phosphate having the general chemical formula $Li_xV_y(PO_4)_z$ and copper have been used as the parent substances for the metallization, and
wherein, in the general chemical formula of the lithium vanadium phosphate, the following applies:
0.5<x<4.5,
1.8<y<2.2, and
2.8<z<3.2.

3. The ceramic component according to claim 1, wherein the metallization has been manufactured from a metal-containing paste which contains copper and lithium vanadium phosphate and glass or copper and lithium vanadium phosphate.

4. The ceramic component according to claim 1, wherein the ceramic component is a ceramic battery.

5. The ceramic component according to claim 1, wherein the metallization is a connecting surface for electrical contacting of the ceramic component.

6. The ceramic component according to claim 1, wherein the metallization has at least one top layer containing at least copper and/or nickel and/or tin.

7. The ceramic component according to claim 1, wherein the ceramic component is a solderable surface mounted device.

8. A method for manufacturing a ceramic component, the method comprising:
providing a green body;
rounding edges of the green body;
affixing a metal-containing paste to at least one outer surface of the green body; and
sintering the green body in order to obtain the ceramic base body with a metallization on the outer surface,
wherein the metal-containing paste contains copper, lithium vanadium phosphate, optionally glass, binding agents and solvents, wherein a is a proportion of the copper, b is a proportion of the lithium vanadium phosphate, c is a proportion of the optional glass, and d is a proportion of the binding agents and the solvents, wherein the following applies:

40 wt. % ≤ a ≤ 90 wt. %, 1 wt. % ≤ b ≤ 30 wt. %, 0 wt. % ≤ c ≤ 20 wt. %, and 9 wt. % ≤ d ≤ 59 wt. %, wherein lithium vanadium phosphate of the metallization has the general chemical formula $Li_xN_y(PO_4)$, wherein x is a proportion of lithium, y is a proportion of vanadium and z is a proportion of phosphate in lithium vanadium phosphate, and wherein the following applies:

0 < x,

0 < y, and

0 < z.

9. The method according to claim 8, further comprising performing a thermal process, wherein the thermal process is sintering, and wherein the thermal process is performed in a reductive atmosphere.

10. The method according to claim 8, wherein at least one top layer containing copper and/or tin and/or nickel is affixed to the metallization.

11. The method according to claim 8, further comprising performing a thermal process, wherein the thermal process is a burning-in process, and wherein the thermal process is performed in a reductive atmosphere.

12. The method according to claim 8, further comprising performing a thermal process, wherein the thermal process comprises sintering and a burning-in process, and wherein the thermal process is performed in a reductive atmosphere.

13. A method for manufacturing a ceramic component, the method comprising:

providing a green body;

sintering the green body in order to obtain a ceramic base body;

rounding edges of the ceramic base body;

affixing a metal-containing paste to at least one outer surface of the ceramic base body; and burning the metal-containing paste into the ceramic base body in order to obtain a metallization, wherein the metal-containing paste contains copper, lithium vanadium phosphate, optionally glass, binding agents and solvents, wherein a is a proportion of the copper, b is a proportion of the lithium vanadium phosphate, c is a proportion of the optional glass, d is a proportion of the binding agents and solvents, wherein the following applies:

40 wt. % ≤ a ≤ 90 wt. %, 1 wt. % ≤ b ≤ 30 wt. %, 0 wt. % ≤ c ≤ 20 wt. %, and 9 wt. % ≤ d ≤ 59 wt. %, wherein lithium vanadium phosphate of the metallization has the general chemical formula $Li_xN_y(PO_4)$, wherein x is a proportion of lithium, y is a proportion of vanadium and z is a proportion of phosphate in lithium vanadium phosphate, and wherein the following applies:

0 < x,

0 < y, and

0 < z.

14. The method according to claim 13, wherein at least one thermal process is selected from the group consisting of sintering and a burning-in process, and wherein the thermal process is performed in a reductive atmosphere.

15. The method according to claim 13, wherein at least one top layer containing copper and/or tin and/or nickel is affixed to the metallization.

* * * * *

UNITED STATES PATENT AND TRADEMARK OFFICE
CERTIFICATE OF CORRECTION

PATENT NO. : 11,916,236 B2
APPLICATION NO. : 17/042718
DATED : February 27, 2024
INVENTOR(S) : Stefan Obermair It is certified that error appears in the above-identified patent and that said Letters Patent is hereby corrected as shown below:

In the Claims

Claim 8, Column 5, Line 11; insert --z-- after ")".

Claim 13, Column 6, Line 21; insert --z-- after ")".

Signed and Sealed this
Seventh Day of May, 2024

Katherine Kelly Vidal
*Director of the United States Patent and Trademark Office*